United States Patent
Mao

(10) Patent No.: US 10,170,966 B2
(45) Date of Patent: Jan. 1, 2019

(54) VIBRATION MOTOR

(71) Applicant: Lubin Mao, Shenzhen (CN)

(72) Inventor: Lubin Mao, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 257 days.

(21) Appl. No.: 15/254,276

(22) Filed: Sep. 1, 2016

(65) Prior Publication Data

US 2017/0117789 A1    Apr. 27, 2017

(30) Foreign Application Priority Data

Oct. 21, 2015   (CN) .......................... 2015 1 0690817

(51) Int. Cl.
*H02K 33/00*     (2006.01)
*H02K 33/16*     (2006.01)

(52) U.S. Cl.
CPC ............. *H02K 33/00* (2013.01); *H02K 33/16* (2013.01)

(58) Field of Classification Search
CPC ......... H02K 33/00; H02K 33/02; H02K 33/16
See application file for complete search history.

(56) References Cited

U.S. PATENT DOCUMENTS

2011/0018365 A1* 1/2011 Kim ....................... B06B 1/045
310/17

* cited by examiner

*Primary Examiner* — Dang D Le
(74) *Attorney, Agent, or Firm* — Na Xu; IPro, PLLC

(57) ABSTRACT

A vibration motor includes a housing forming an accommodation space, the housing including a first side wall extending along a vibration direction of the vibration motor and a second side wall connecting with the first side wall and extending along a direction vertical to vibration direction; a vibration system accommodated in the accommodation space, the vibration system having an end surface arranged opposite to the second side wall; an elastic part suspending the vibration system in the accommodation space elastically, the elastic part including a fixation portion connected with the end surface of the vibration system, and an elastic portion extending from two ends of the fixation portion for providing restoring force to the vibration system. The elastic portion includes a hindering portion for baffling the vibration system from vibration in the vibration direction.

5 Claims, 6 Drawing Sheets

VIBRATION MOTOR

FIELD OF THE INVENTION

The present disclosure is related to vibration motors, specifically related to a vibration motor for portable consumer electronic products.

DESCRIPTION OF RELATED ART

A vibration motor is applied to feedback of system generally, for example, incoming call prompt, message prompt and navigation prompt of mobile phone, vibration feedback of game player, etc. for portable consumer electronic products, such as mobile phone, handheld game player, navigation unit or handheld multimedia entertainment equipment which is more and more popular with people along with the development of the electronic technique.

The vibration motor usually includes a housing having an accommodation space, a vibration system accommodated in the accommodation space and elastic parts respectively connected with the housing and the vibration system; and the vibration system is supported by the elastic parts to vibrate in the housing by means of reciprocating motion. However, the vibration system also vibrates along the direction vertical to the vibration direction thereof because of not being limited; therefore, the performance and the circle life of the vibration motor shall be affected seriously due to unstable vibration, reduced amplitude of the vibration direction thereof and easy fracture of the connecting place.

Therefore, an improved vibration motor which can overcome the problems mentioned above is accordingly desired.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of present disclosure more apparent, the present disclosure is described in further detail together with the figures and the embodiments. It should be understood the specific embodiments described hereby are only to explain this disclosure, not intended to limit this disclosure.

Figure 1:
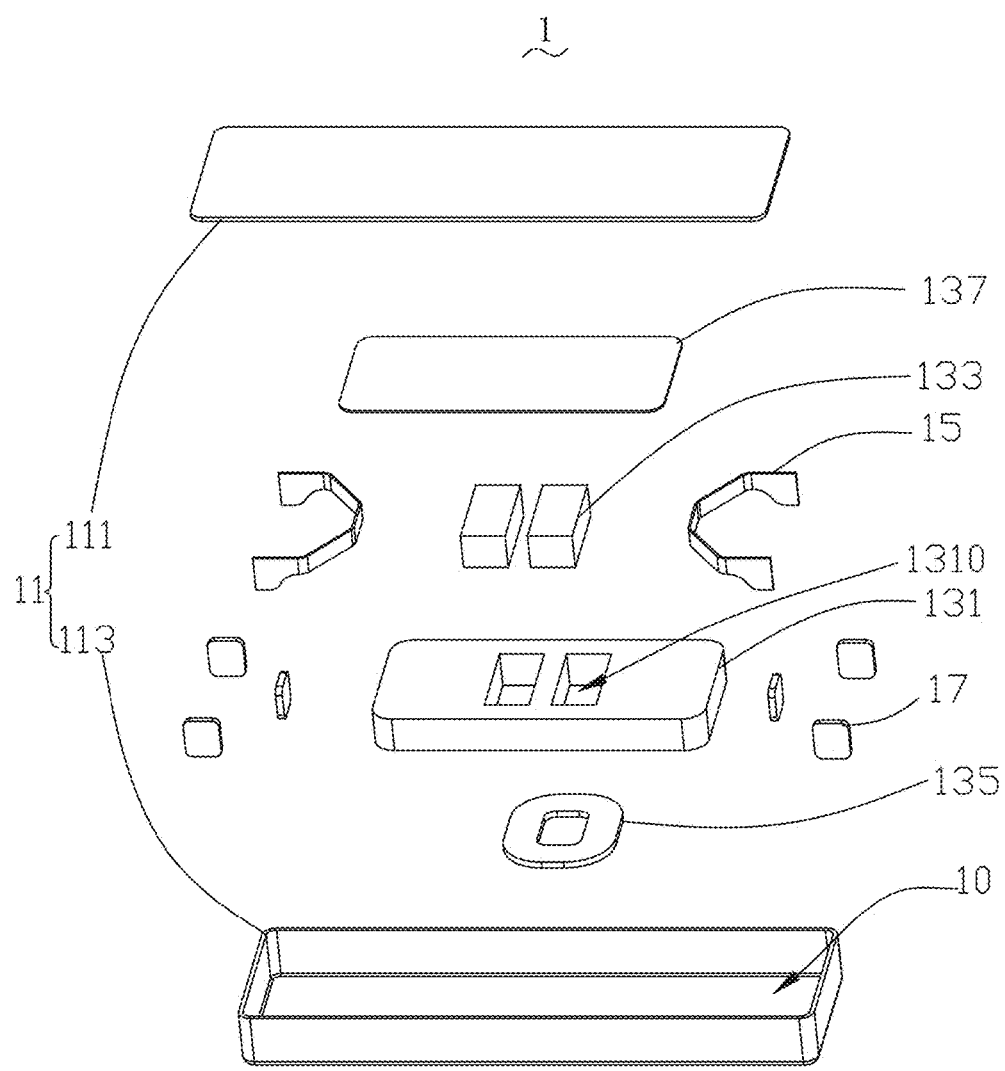
FIG. 1 is an isometric and exploded view of a vibration motor in accordance with a first exemplary embodiment of the present disclosure.
Figure 2:
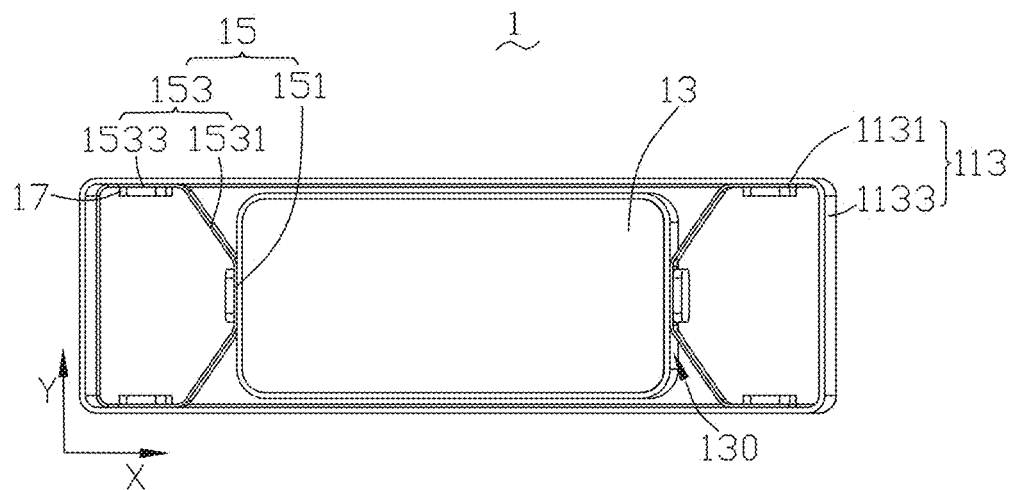
FIG. 2 is a front view of the vibration motor in FIG. 1 with a cover plate thereof removed.

Referring to FIGS. 1-2, a vibration motor 1, in accordance with a first exemplary embodiment of the present disclosure, comprises a housing 11 having an accommodation space 10, a vibration system 13 accommodated in the accommodation space 10, a pair of elastic parts 15 by which the vibration system 13 is supported in the accommodation space and a soldering lug 17. Moreover, the two elastic parts 15 are arranged on two ends of the vibration system 13 symmetrically; and the elastic parts 15 are connected with the housing 11 and the vibration system 13 fixedly by using the soldering lug 17.

The housing 11 includes a cover plate 111 and a base 113 engaging with the cover plate 111. The base 113 has a pair of first side walls 1131 extending parallel to a direction X and a pair of second side walls 1133 extending parallel to a direction Y; and the accommodation 10 is formed by connecting the first side walls 1131 and the second side walls 1133, wherein the vibration direction of the vibration system 15 shall be taken as the direction X, and the direction vertical to the direction X on the plane parallel with the cover plate 111 shall be taken as the direction Y.

The vibration system 13 comprises a weight 131 having two through holes 1310, a pair of permanent magnets 133 accommodated in the two through holes 1310, a plurality of coils 135 arranged under the permanent magnets 133 and a magnetic plate 137 stacked on the weight 131. The polarization effect of the pole can be strengthened, and the amplitude of the vibration system 13 can be increased by using the magnetic plate 137. Moreover, the vibration system 13 has an end surface 130 opposite to the second side wall 1133 on the weight 131.

Figure 3:
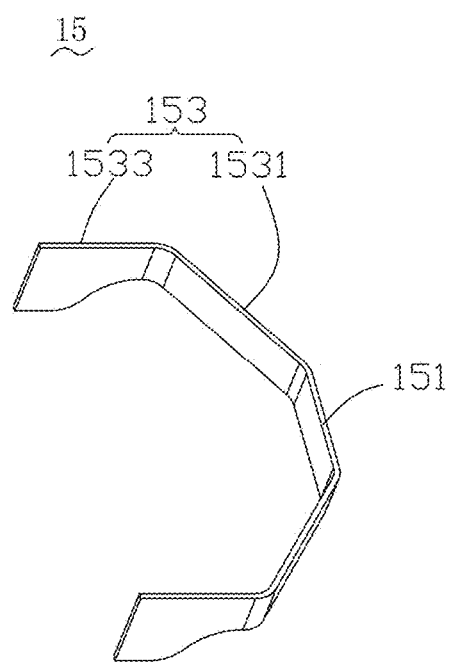
FIG. 3 is an isometric view of an elastic part of the vibration motor in FIG. 1.

Referring to FIG. 3, the elastic part 15 comprises a fixation portion 151 connecting with the end surface 130 fixedly and two elastic portions 153 extending from two ends of the fixation portion 151 respectively, wherein the two elastic portions 153 are separated from each other. Moreover, the two elastic portions 153 are arranged symmetrically, and have the hindering portions for preventing the vibration system 13 from vibration parallel with the direction Y.

The fixation portion 151 is connected with the middle position of the end surface 130 fixedly by using the soldering lug 17; therefore, the elastic part 15 is connected with the vibration system 13.

In this embodiment, the elastic portion 153 comprises a connecting portion 1531 extending from the fixation portion 151 in a zigzag form and an end portion 1533 extending from the connecting portion 1531. The end portion 1533 of the two elastic portion 153 are connected with the two first side walls 1131 fixedly by using the soldering lug 17, respectively. The elastic parts 15 shall provide elastic force of reciprocating motion for the vibration system 13 when the vibration 13 vibrates parallel with the direction X. At the same time, the vibration system 13 has the stable vibration and great amplitude, and the fracture of the connecting places between the elastic parts 15 and the housing 11 and the vibration system 13 can be avoided because the vibration system 13 has the elastic force parallel with the direction X since the end portion 1533, also taken as the hindering portion, can prevent the vibration system 13 in the direction Y; therefore, the circle life of the vibration motor 1 can be increased.

Figure 4:
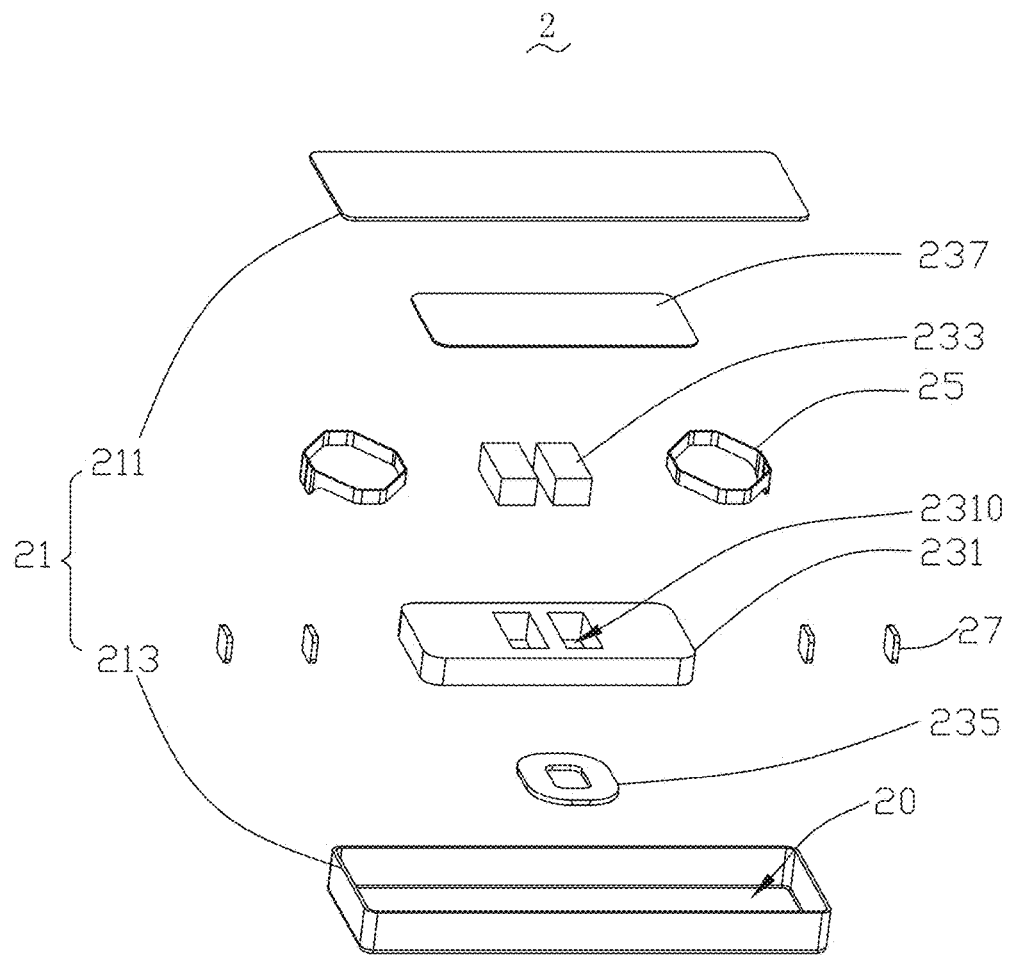
FIG. 4 is an isometric and exploded view of a vibration motor in accordance with a second exemplary embodiment of the present disclosure.
Figure 5:
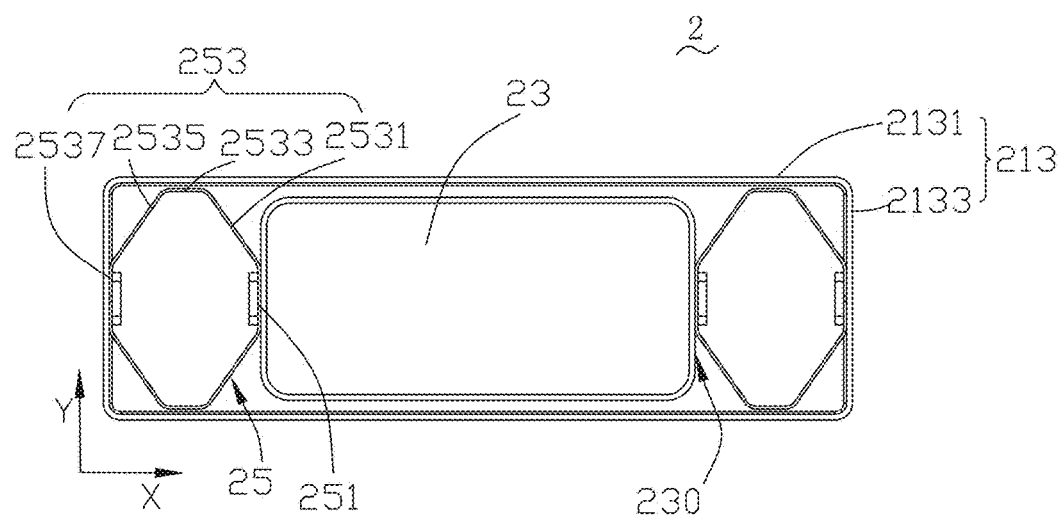
FIG. 5 is a front view of the vibration motor in FIG. 4 with a cover plate thereof removed.

Referring to FIGS. 4-5, a vibration motor 2 in accordance with a second embodiment, comprises a housing 21 having an accommodation space 20, a vibration system 23 accommodated in the accommodation space 20, two elastic parts 25 by which the vibration system 23 is supported in the accommodation space 20 and a soldering lug 27. Moreover, the two elastic parts 25 are arranged on two ends of the vibration system 23 symmetrically; and the elastic parts 25 are connected with the housing 21 and the vibration system 23 fixedly by the soldering lug 27.

The housing 21 includes a cover plate 211 and a base 213 engaging with the cover plate 211. The base 213 has two first side walls 2131 extending parallel with the direction X and two second side walls 2133 extending parallel with the direction Y; and the accommodation 20 is formed after connecting the two first side walls 2131 and the two second side walls 2133, wherein the vibration direction of the vibration system 25 shall be taken as the direction X, and the direction vertical to the direction X on the plane parallel with the cover plate 211 shall be taken as the direction Y.

The vibration system 23 comprises a weight 231 having two through holes 2310, two permanent magnets 233 accommodated in the two through holes 2310, coils 235 arranged under the permanent magnets 233 and a magnetic plate 237 stacked on the weight 231. The polarization effect of the pole can be strengthened, and the amplitude of the vibration system 23 can be increased by using the magnetic plate 237. Moreover, the vibration system 23 has an end surface 230 opposite to the second side wall 2133 on the weight 231.

Figure 6:
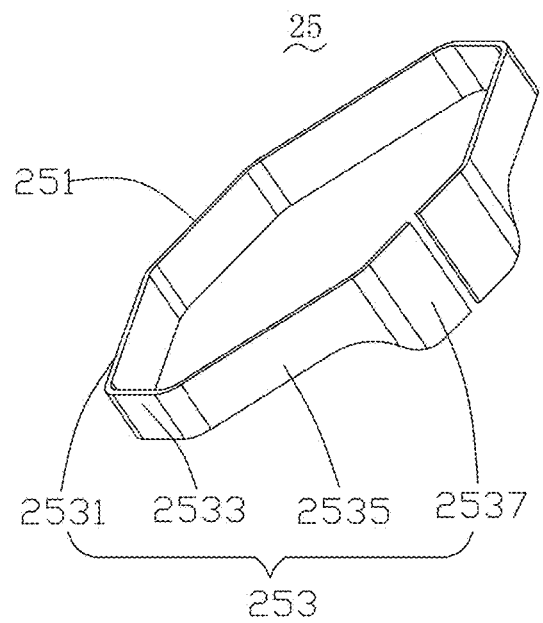
FIG. 6 is an illustration of an elastic part of the vibration motor in FIG. 4.

Referring to FIG. 6, the elastic part 25 comprises a fixation portion 251 and two elastic portions 253 extending from two ends of the fixation portion 251 respectively, wherein the two elastic portions 253 are arranged symmetrically, extend in the way of being far from each other and have the hindering portions formed to prevent the vibration system 13 from vibration parallel with the direction Y.

The fixation portion 251 is connected with a middle portion of the end surface 230 fixedly by the soldering lug 27; therefore, the elastic part 25 is connected with the vibration system 23.

In this embodiment, the elastic portion 253 comprises a first connecting portion extending from the fixation portion 251 in the zigzag form, an abutting portion 2533 extending from the first connecting portion 2531 in the zigzag form, a second connecting portion 2535 extending from the abutting portion 2533 in the zigzag form and the end portion 2537 extending from the second connecting portion 2535. The fixation portion 251 is connected with the end surface 230 of the vibration system 23 fixedly by using the soldering lug 27; the end portions 2537 of the two elastic portions 253 are connected with the second side wall 2133 fixedly by using the soldering lug 27. The abutting portion 2533 extends along the direction X and is propped against or connected with the first side wall 2131 fixedly. Most preferably, the abutting portion 2533 is propped against the first side wall 2131 in this mode of execution; the first connecting portion 2531 and the second connecting portion 2535 shall provide the vibration system 23 with the elastic force, therefore the vibration system 23 has greater amplitude in the direction X. At the same time, the abutting portion 2533, taken as the hindering portion, can prevent the vibration system 11 from vibration in the direction Y.

Figure 7:
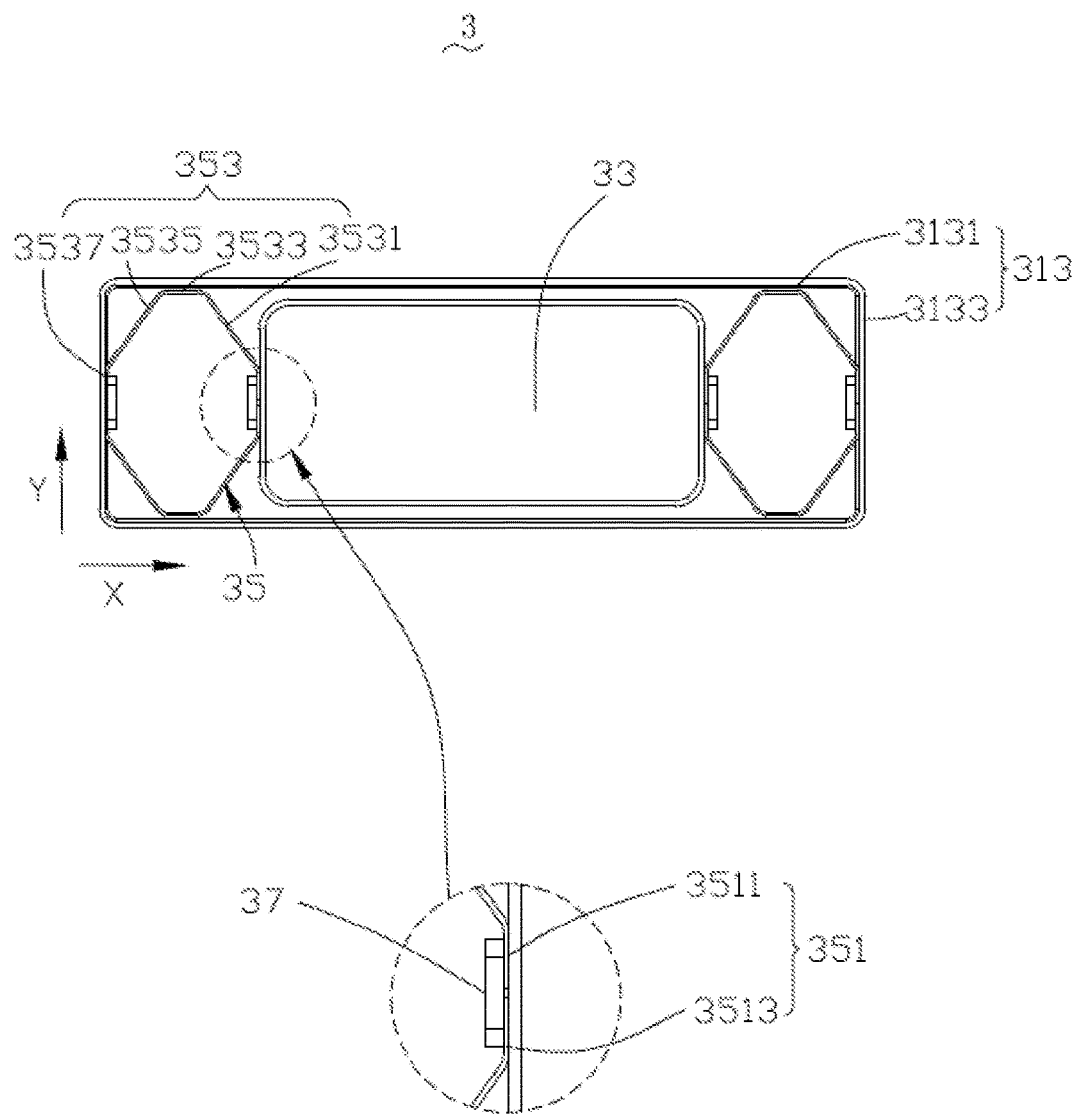
FIG. 7 is a front view of a vibration motor in accordance with a third embodiment of the present disclosure with a cover plate thereof removed.

Referring to FIG. 7, a vibration motor 3 has a housing (not shown) having a structure identical to that in the second embodiment, a base 313, a vibration system 33 and a soldering lug 37. The vibration motor 3 also comprises two elastic parts 35 which are arranged symmetrically and connected with the housing and the vibration system at the same time. Moreover, the elastic parts 35 are connected with the housing and the vibration system 33 fixedly by using the soldering lug 37.

The base 313 comprises a first side wall 3131 and a second side wall 3133. Similarly, the vibration system 33 also has a structure identical to that of the vibration system 23 in the second embodiment. Moreover, the vibration direction of the vibration system 33 shall be taken as the direction X, and the direction vertical to the direction X on the plane parallel with the bottom of the base 313 shall be taken as the direction Y.

Figure 8:
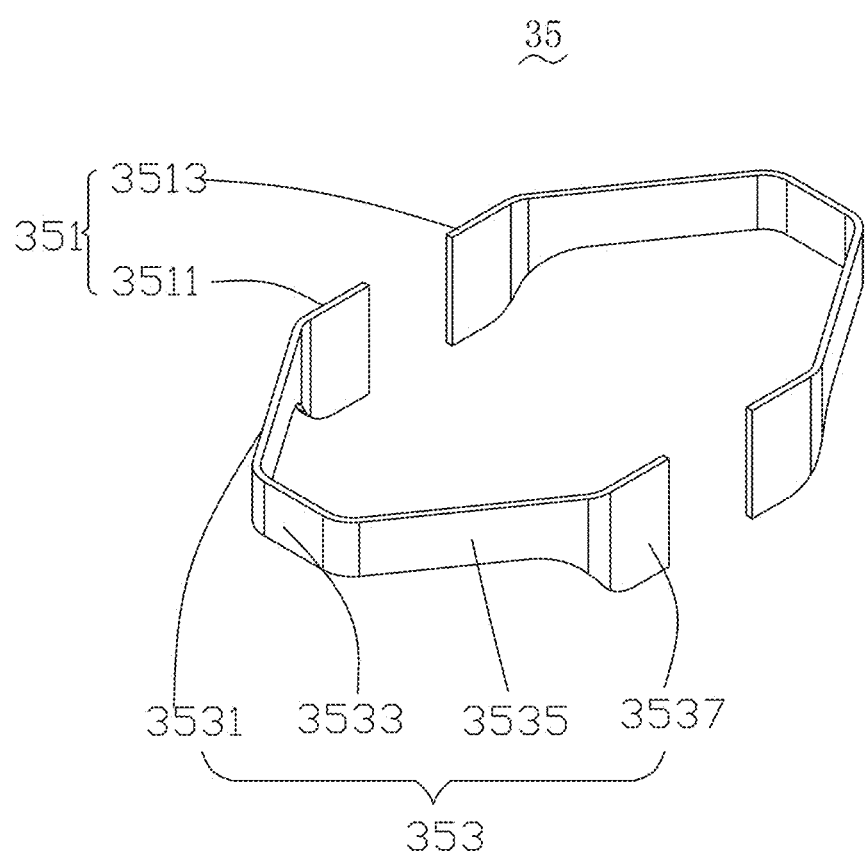
FIG. 8 is an illustration of an elastic part of the vibration motor in FIG. 7.

Referring to FIG. 8, an elastic part 35 comprises a fixation portion 351 and two elastic portions 353 extending from two ends of the fixation portion 351 respectively and extending in the way of being far from each other, wherein the two elastic portions 253 are arranged symmetrically, and have the hindering portions formed to prevent the vibration system 33 from vibration parallel with the direction Y.

The fixation portion 351 comprises a first fixation portion 3511 and a second fixation portion 3513, wherein most preferably the first fixation portion 3511 and the second fixation portion 3513 are the same in structure and are connected with the vibration system 33 symmetrically and fixedly by using the soldering lug 37; therefore, the elastic part 35 is composed of two independent elastic portions 353, with simpler structure and easy processing.

The two elastic portions 353 are formed by the first fixation portion 3511 and the second fixation portion 3513 after extension, respectively and have the first connecting portion 3531, the abutting portion 3533, the second connecting portion 3535 and the end portion 3537 having structures identical to those in the second embodiment. The end portions 3537 of the two elastic portions 353 are connected with the second side wall 3133 fixedly by using the soldering lug 37, and the two abutting portions 3533 are propped against the two first side wall 3131, respectively. The first connecting portion 3531 and the second connecting portion 3535 shall provide the vibration system 33 with the elastic force in direction X when the vibration system 33 vibrates; therefore, the amplitude shall be greater. At the same time, the abutting portion 3533, as the hindering portion, shall prevent the vibration system 33 from vibration along the direction Y; therefore, the vibration shall be stable.

The elastic part in the invention has the hindering portions applied to prevention of the vibration system from vibration in the extension direction parallel with the second side wall compared with relevant technologies; therefore, the vibration of the vibration system in the extension direction parallel with the second side wall can be prevented effectively, and the vibration motor has the stable vibration, great amplitude, easy processing and long service life.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor, comprising:

a housing forming an accommodation space, the housing including a first side wall extending along a vibration direction of the vibration motor and a second side wall connecting with the first side wall and extending along a direction vertical to vibration direction;

a vibration system accommodated in the accommodation space, the vibration system having an end surface arranged opposite to the second side wall;

an elastic part suspending the vibration system in the accommodation space elastically, the elastic part comprising a fixation portion connected with the end surface of the vibration system, and an elastic portion extending from two ends of the fixation portion for providing restoring force to the vibration system, wherein the elastic portion includes a hindering portion for baffling the vibration system from vibration in the vibration direction;

the elastic portion includes a first connecting portion extending from the fixation portion, an abutting portion extending from the first connecting portion, a second connecting portion extending from the abutting portion, and an and the end portion extending from the second connecting portion; the end portion is connected with the second side wall fixedly; the abutting portion is propped against the first side wall; and the abutting portion serves as the hindering portion.

2. The vibration motor as described in claim 1, wherein the abutting portion extends along a direction parallel with the first side wall, and a gap is accordingly formed between the abutting portion and the first side wall.

3. The vibration motor as described in claim 1, wherein the abutting portion extends along a direction parallel with the first side wall and is connected with the first side wall fixedly.

4. The vibration motor as described in claim 1, wherein the first connecting portion and the second connecting portion are arranged symmetrically oppositely to the abutting portion.

5. The vibration motor as described in claim 1, wherein the fixation portion is broken at a middle part thereof.

* * * * *